United States Patent
Minick et al.

(10) Patent No.: US 8,061,307 B2
(45) Date of Patent: Nov. 22, 2011

(54) LICK DETERRENT TUBING

(75) Inventors: Chris A. Minick, Stillwater, MN (US); Brian Dingman, Spring Valley, WI (US); James F. Pitzen, Stillwater, MN (US)

(73) Assignee: Mark Anderson, Spring Valley, WI (US)

( * ) Notice: Subject to any disclaimer, the term of this patent is extended or adjusted under 35 U.S.C. 154(b) by 118 days.

(21) Appl. No.: 12/357,618

(22) Filed: Jan. 22, 2009

(65) Prior Publication Data
US 2009/0188440 A1   Jul. 30, 2009

Related U.S. Application Data

(60) Provisional application No. 61/062,532, filed on Jan. 28, 2008.

(51) Int. Cl.
*A01K 15/04* (2006.01)
*A61N 1/30* (2006.01)

(52) U.S. Cl. .......... 119/822; 119/859; 119/908; 604/20; 340/573.1; 340/573.3

(58) Field of Classification Search ............ 119/822, 119/859, 856, 712, 908; 601/20, 21; 607/58, 607/115, 134, 120, 138; 604/20; 340/573.2, 340/573.3, 573.1
See application file for complete search history.

(56) References Cited

U.S. PATENT DOCUMENTS

| | | | |
|---|---|---|---|
| 2,177,789 A | 10/1939 | Stacker | |
| 2,998,008 A | 8/1961 | Klesa | |
| 3,042,036 A | 7/1962 | Abadjieff | |
| 3,070,132 A * | 12/1962 | Sheridan | 138/118 |
| 3,580,983 A * | 5/1971 | Jackson | 174/47 |
| 3,659,588 A * | 5/1972 | Kahn et al. | 600/301 |
| 3,942,306 A | 3/1976 | Kulka | |
| 4,036,179 A | 7/1977 | Turner et al. | |
| 4,153,009 A | 5/1979 | Boyle | |
| 4,476,814 A | 10/1984 | Miller | |
| 5,139,684 A * | 8/1992 | Kaali et al. | 205/701 |
| 5,469,814 A | 11/1995 | Moy et al. | |
| 5,896,830 A | 4/1999 | Stampe | |
| D417,529 S | 12/1999 | Stampe | |
| 6,453,850 B1 | 9/2002 | Stampe | |
| 6,561,136 B2 | 5/2003 | Kuntz | |
| 6,817,138 B1 | 11/2004 | McGill | |
| 6,925,748 B2 | 8/2005 | McGill | |
| 7,020,995 B1 | 4/2006 | Snow | |
| 7,219,627 B1 * | 5/2007 | Egloff | 119/859 |

* cited by examiner

*Primary Examiner* — Rob Swiatek
*Assistant Examiner* — Joshua Huson
(74) *Attorney, Agent, or Firm* — Skinner & Associates

(57) ABSTRACT

A deterrent apparatus having a non-conductive tubing having a length, an outer surface and an inner surface defining a lumen, and at least a first electrical conductor and a second electrical conductor present on the outer surface of the non-conductive tubing. A power source comprising a battery having a first terminal and a second terminal is connected to the conductors so that the first terminal is electrically connected to the first conductor and the second terminal is electrically connected to the second conductor. The deterrent apparatus is suitable for use on medical tubing or veterinary tubing, for example, to deter animals from chewing or biting at the tubing.

16 Claims, 2 Drawing Sheets

LICK DETERRENT TUBING

RELATED APPLICATION

This application claims priority to U.S. provisional patent application No. 61/062,532, filed on Jan. 28, 2008 and titled VETERINARY MEDICAL TUBING REMOVAL DETERRENT TECHNOLOGY. The entire disclosure of application No. 61/062,532 is incorporated herein by reference.

FIELD OF THE INVENTION

The present invention relates, generally, to tubing apparatus for liquids and methods of using. More particularly, the invention relates to a lick and bite deterrent apparatus and methods for use in fluid therapy administered to small animals such as dogs and cats. The invention may be used in the veterinary field and in other fields and applications.

BACKGROUND

There exist various medical tubes, hoses or lines which function to administer fluids (liquid or gas), medicines and/or nourishment into the body of a patient. In some embodiments, the patient is an animal, for example, a dog or a cat. IV lines are typically thin, flexible, plastic tubes that run from a bottle or bag of liquid a certain distance to an injection needle or to an intravenous catheter placed in a vein in the patient's body. Medicines may be injected into the IV system and infused into the fluid contained in the bottle or bag. The rate or speed of the infusion is typically set or controlled by a roller clamp on the tube, by a balloon that squeezes out the medicine, or by an electronic pump. Gas tubes are somewhat similar to IV lines, and typically transmit oxygen gas from a tank to a mask or small tubes (e.g., nasal cannula) placed just inside the nostrils. Feeding tubes transmit liquid food or nutrients from a bag or bottle to a tube placed in the stomach or the small intestine. The tube may go in through the nose or via the wall of the stomach. Liquids in IV lines must be sterile to avoid introducing germs into the bloodstream and causing infections. The IV lines must be handled carefully to keep germs out of the patient's body. Tube feedings and oxygen tubes should be kept clean, but do not have to be sterile.

From time-to-time, patients, particularly animals, resist having medical tubes attached to them. The tubing may cause discomfort. Also, animals are naturally inclined to attempt to remove such devices by licking or biting the device. If the patient removes the device, the effect of the medication, feeding or breathing means will be lost, resulting in a danger to the patient. At the very least, this necessitates reapplication of a new tube, incurring added expense in both time and money.

For animals, a common device to deter this removal is the placement of a collar on the animal so that it cannot gain access to the device. This is not always effective and thus a solution to this problem has been to devise a means to deter the animal from removing the therapeutic device.

In addition to the collar, there exists a means to deter animals from licking, chewing or removing bandages, wraps, and the like attached to the animal for treatment of wounds and surgical incisions. A product, STOPLIK™ Lick Deterrent System, is manufactured and sold by Rockway, Inc. of Spring Valley, Wis., USA. This deterrent device includes an adhesive strip with low electric current for application to the body of an animal either on, over or adjacent to a wound or injury to deter or discourage the animal from aggregating the wound by licking or chewing on the wound or the wrap or bandage. This device is described in U.S. Pat. Nos. 5,896,830 and 6,453,850. This device comprises a strip-like laminate body, adhesively coated on the inward side and with printed conductors on the outward side connected to a battery. When the animal attempts to remove the wound wrapping by licking or biting, a low voltage electrical shock is administered when the tongue contacts both terminals of the printed conductive surface.

The existing technology is believed to have limitations and shortcomings. A need therefor exists for improvements.

BRIEF SUMMARY

The present disclosure provides an apparatus and method of use for discouraging or deterring contact with medical lines or tubing. In some embodiments, the medical lines are attached to or otherwise located in the immediate vicinity of an animal patient; the apparatus deters the animal from removing or attempting to remove the line.

One particular embodiment of this disclosure is a deterrent apparatus having a non-conductive tubing having a length, an outer surface and an inner surface defining a lumen, and at least a first electrical conductor and a second electrical conductor present on the outer surface of the non-conductive tubing. A power source comprising a battery having a first terminal and a second terminal is connected to the conductors so that the first terminal is electrically connected to the first conductor and the second terminal is electrically connected to the second conductor. The conductors may extend the length of the tubing in a spiral manner or a non-spiral manner. The conductors may be present on the surface of the tubing or within the tubing.

Another particular embodiment of this disclosure is a deterrent apparatus having a non-conductive tubing having a length, an outer surface and an inner surface defining a lumen, and a first electrical conductor set and a second electrical conductor set present at the outer surface of the non-conductive tubing. A power source having a first output and a second output is connected to the conductor sets so that the first output is electrically connected to the first conductor set and the second output is electrically connected to the second conductor set. The first electrical conductor set and the second electrical conductor set may extend the length of the tubing in a spiral manner or a non-spiral manner. The number of conductors in the conductor sets may be the same or different. The conductors may be present on the surface of the tubing or within the tubing.

The electrical conductors may be electrically conductive wire, foil, tape, thread, conductive ink or conductive polymer. Suitable conductors include copper, stainless steel, silver, and carbon.

For any of the embodiments, the power source may be a battery with a cathode and an anode, and may be present at or proximate the tubing or may be remote.

These and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings, in which.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
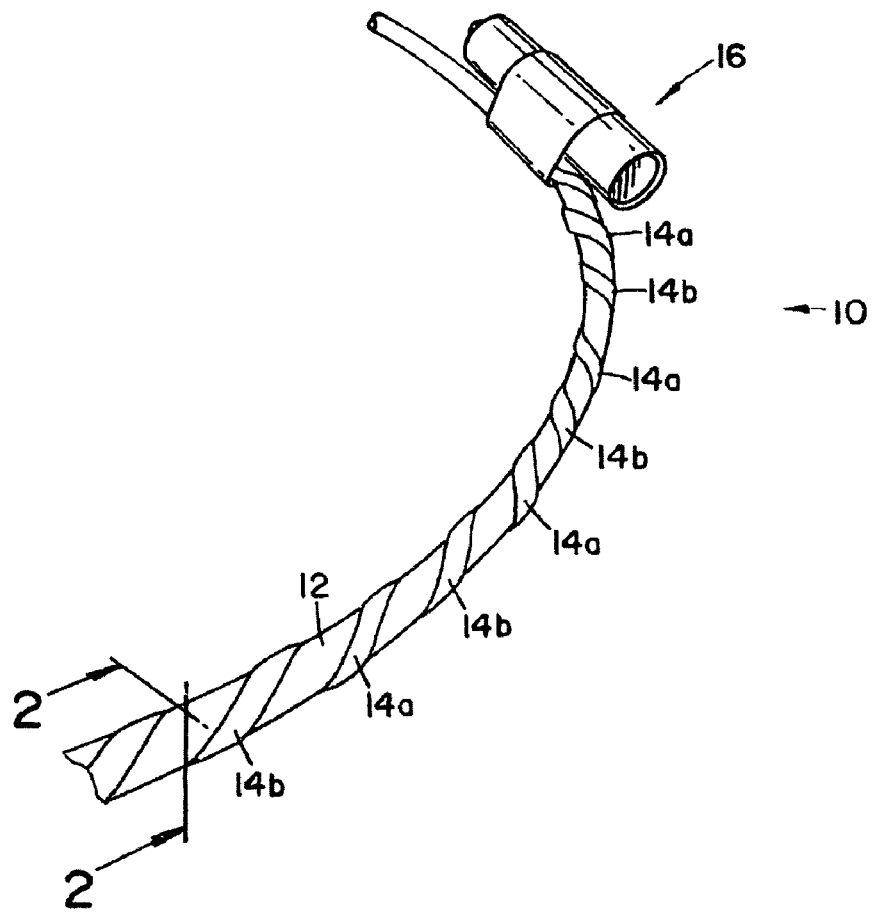
FIG. 1 is a perspective view of a first embodiment of a deterrent apparatus of the present invention.

The following description provides a deterrent apparatus for tubing, such as veterinary medical tubing and the like, which is practical, reliable, efficient, and safe, and which is believed to fulfill the need and to constitute an improvement over the background technology.

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense. Any definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

In a basic aspect, the disclosure provides an apparatus that has an elongated tube body, at least two elongated electrical conductors connected to the tube body surface in a predetermined configuration, and a power source in electrical connection with the electrical conductors, the conductors being configured so that they may be contacted on the outside of the tube body by a patient's (e.g., an animal's) tongue or saliva. Upon contact, an electrical circuit is completed thereby delivering a mild electric shock to the patient.

In another basic aspect, the disclosure provides an apparatus for discouraging or deterring a patient (e.g., an animal) from removing or attempting to remove medical (e.g., veterinary) lines which are attached to them or otherwise located in their immediate vicinity. An example of a medical line is intravenous tubing. The apparatus includes a tube body, two electrical conductors connected to the tube body surface, and a power source. The tube is constructed of a non-conductive material (e.g., an insulating material) and may be of varying diameter and/or length. The conductors are positioned so that they may be contacted on the outside of the tube body, and upon direct contact with the patient's (e.g., animal's) tongue or by saliva, an electrical circuit is completed through the tongue, conductors and power source, thereby delivering a mild electric shock through the sensitive tissues of the patient. The low voltage electrical shock is harmless to the patient but is unpleasant, thus the patient does not attempt further contact with the apparatus.

Any of the apparatus of this disclosure may be part of a veterinary IV line system, including the fluid source and the delivery element. This disclosure provides a medical IV line system for discouraging or deterring patients from removing or attempting to remove the system which is attached to them or otherwise located in their immediate vicinity. In some embodiments, the line system is a veterinary IV line system for discouraging or deterring animals from removing or attempting to remove the system which is attached to them or otherwise located in their immediate vicinity. The IV line system comprises a non-conductive, elongated tube body of a predetermined length and diameter having a central lumen and an input end and an output end, two elongated electrical conductors connected to the tube body, and a power source, the conductors being configured so that they may be contacted on the outside of the tube body, and upon contact with the patient's tongue or saliva, an electrical circuit is completed through the tongue, conductors and power source, thereby delivering a mild electric shock to the patient. The electrical conductors may be connected to the tube body in a spiral, wrapped configuration. The system also includes a fluid source connected to the input end of the tube body, and a delivery element connected to the output end of the tube body and to body of the patient at its other end, the tube delivering fluid from the fluid source to the delivery element.

While the present disclosure is not so limited, an appreciation of various aspects of the disclosure will be gained through a discussion of the examples provided below.

Figure 2:
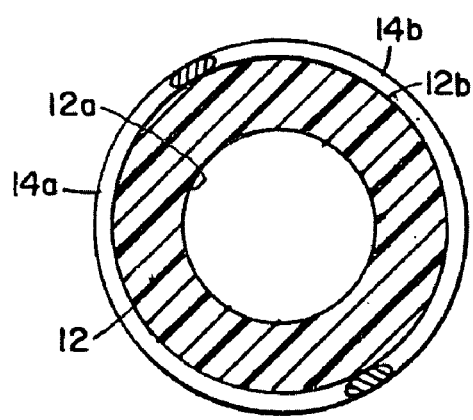
FIG. 2 is a cross-sectional view of the apparatus of FIG. 1 taken along line 2-2.

Referring to FIGS. 1 and 2, a basic embodiment of a deterrent apparatus 10 is illustrated. Apparatus 10 has a tube body 12, at least two electrical conductor sets 14a and 14b connected to tube body 12 in a predetermined configuration, and a power source 16 electrically connected to conductor sets 14a, 14b. In this embodiment, each conductor set 14a, 14b consist of one electrical conductor.

Tube body 12 is typically a flexible polymeric tube that is electrically insulating or non-conductive in any position. Tube body 12 has in interior surface 12a that defines a central lumen and has an exterior surface 12b. Tube body 12 is constructed of a non-conductive material such as a polymeric material; in most embodiments, tube body 12 is electrically insulating. Defined by interior surface 12a and exterior surface 12b, tube body 12 has a thickness. Although not illustrated in FIG. 1 or 2, tube body 12 has a first end (e.g., an inlet) and a second end (e.g., an outlet). Tube body 12 may have a varying diameter from its first end to its second end.

Electrical conductor sets 14a, 14b are present on tube body 12 and electrically insulated from each other. In this embodiment, electrical conductor sets 14a, 14b are wrapped spirally around tube body 12 on exterior surface 12B. The conductors of sets 14a, 14b may be a conductive material bonded (e.g., adhesively bonded) onto exterior surface 12b, may be conductive material printed onto exterior surface 12b, or may be integrally formed with body 12. In some embodiments, the conductors are continuous conductive (e.g., metallic) wire, foil, tape, or threads. In other embodiments, the conductors are composed of a plurality of conductive fibers or particles with a carrier (e.g., a polymeric carrier). Examples of suitable conductive materials include copper, stainless steel, silver, and carbon (e.g., graphite, carbon black). In this embodiment, conductor sets 14a, 14b are spiral wrapped along the length of tube body 12 in a manner that the individual conductors of sets 14a, 14b do not contact each other. Conductor sets 14a, 14b are electrically connected to power source 16.

Power source 16 has positive and negative outputs to provide positive and negative voltage. Conductor sets 14a, 14b are connected to power source 16 so that one conductor set (e.g., conductor set 14a) is positive and the other set (e.g., conductor set 14b) is negative, relative to the other. If power source 16 is a battery, the two outputs would be two terminals (i.e., anode and cathode). Power source 16 of this illustrated embodiment is a battery coupled to and in circuit with conductor sets 14a, 14b. In some embodiments, power source 16 may be a plurality of batteries, arranged in parallel or series. Examples of suitable batteries include lithium batteries, which have lithium metal or lithium compounds as an anode. Depending on the design and chemical compounds used, lithium cells can produce voltages from 1.5 volts to about 3 volts, direct current. This is twice the voltage of ordinary zinc-carbon or alkaline cell, which could alternately be used as power source 16. However, lithium batteries are also lighter in weight than conventional zinc-carbon or alkaline cells. Power source 16 may be directly physically connected to tube body 12 as in FIG. 1, or may be positioned remote from tube body 12 or otherwise line connected.

Deterrent apparatus 10 functions by emitting a low voltage electrical shock when the electrical circuit is completed through conductor sets 14a, 14b and power source 16 due to electrical connection between conductor set 14a and conductor set 14b. When apparatus 10 is positioned on or in close proximity to an animal patient, the circuit is completed via the sensitive tissues of the animal's mouth when the saliva comes in contact with the charged conductor sets 14a, 14b. The resulting low voltage electrical shock is harmless yet unpleasant to the animal, thus the animal does not subsequently disturb apparatus 10, and healing may proceed as normal.

Figure 3:
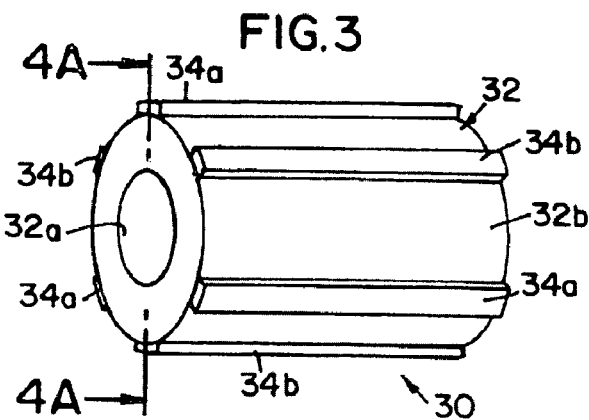
FIG. 3 is a perspective view of a second embodiment of a deterrent apparatus of the present invention.

FIG. 3 illustrates an alternate embodiment of a deterrent device. The various features and elements of deterrent apparatus 30 of FIG. 3 are the same as or similar to the features and elements of deterrent apparatus 10, unless indicated otherwise. Apparatus 30 has a tube body 32 having an interior surface 32a that defines a central lumen and an exterior surface 32b. Positioned on exterior surface 32B are at least two electrical conductor sets 34a and 34b in a predetermined configuration. Conductor sets 34a, 34b extend in a non-spiraling manner along the length of tube 32. Unlike apparatus 10 of FIGS. 1 and 2 where two conductor sets, each having one conductor, spiral around tube body 12, conductor sets 34a, 34b of apparatus 30 each have more than two electrical conductors. Although not illustrated, conductor sets 34a, 34b are electrically connectable to two outputs or terminals (e.g., anode and cathode) of a power source.

Figure 4A:
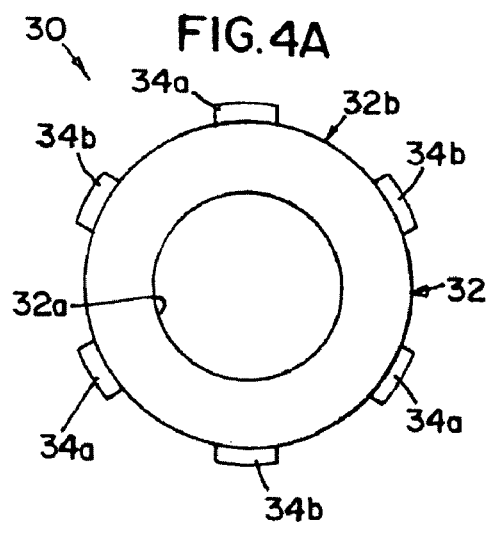
FIG. 4A is a cross-sectional view of the apparatus of FIG. 3 taken along line 4A-4A.

FIG. 4A illustrates an embodiment of apparatus 30 having conductor sets 34a, 34b present on exterior surface 32b of tube body 32. That is, conductor sets 34a, 34b extend above exterior surface 32b of tube 32. The conductors of sets 34a, 34b may be, for example, metal wires or foil applied to surface 32b, for example, by adhesive. Also in this embodiment, the conductors alternate around tube body 32, and the number of conductors in set 34a is the same as the number of conductors in set 34b. In this embodiment, the conductors of sets 34a, 34b are equally spaced around tube body 32, although uneven or unequal spacing could be used.

Figure 4B:
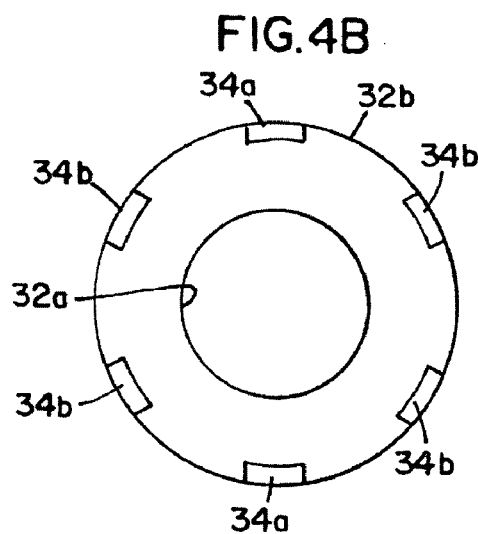
FIG. 4B is a cross-sectional view of an alternate embodiment of the apparatus of FIG. 3.

FIG. 4B illustrates an alternate embodiment of apparatus 30 having conductor sets 34a, 34b present level with exterior surface 32b of tube body 32. The conductors or sets 34a, 34b may be, for example, metal wires or strands insert molded or co-extruded with tube body 32. As another example, the conductors may be formed of conductive polymer (e.g., conductive fibers or particulate in polymer) co-extruded with tube 32. In this embodiment, the conductors of sets 34a, 34b do not alternate around tube body 32, as the number of conductors in set 34b is more than the number of conductors in set 34a. In such embodiments, the two different conductor sets 34a, 34b should be arranged so that contact can be simultaneously made with at least one conductor of set 34a and with at least one conductor of set 34b.

Figure 5:
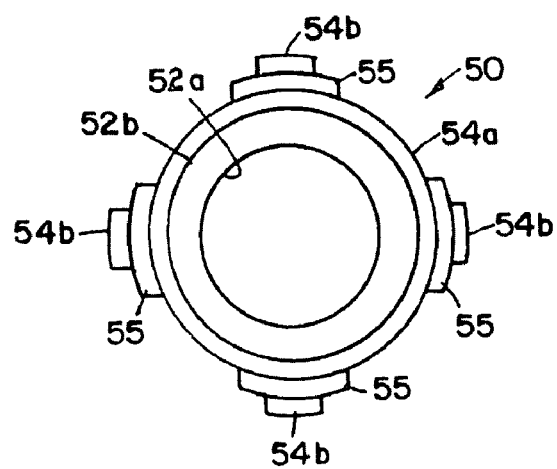
FIG. 5 is a cross-sectional view of a third embodiment of a deterrent apparatus of the present invention.

Another embodiment having different number of conductors in the conductor sets is illustrated in FIG. 5 as apparatus 50. The various features and elements of deterrent apparatus 50 of FIG. 5 are the same as or similar to the features and elements of deterrent apparatus 10 and apparatus 30, unless indicated otherwise. Apparatus 50 has a tube body 52 having an interior surface 52a that defines a central lumen and an exterior surface 52b. Positioned on exterior surface 52b are two electrical conductor sets 54a and 54b in a predetermined configuration.

Apparatus 50 has conductor set 54a having one conductor that extends around tube body 52, covering exterior surface 52b. Conductor set 54a may be formed, for example, by co-extrusion with tube body 52, or by coating tube body 52 by spraying, printing, dipping with a conductive polymer or ink. Positioned at predetermined locations around tube body 52 is conductor sets 54b; in this embodiment, four conductors of set 54b are equally spaced around tube body 52. To inhibit contact between conductor set 54a and conductor set 54b which would short the circuit, an insulating layer 55 is provided between conductor set 54a and conductor set 54b.

Deterrent apparatus 10, 30, 50 described above and variations thereof may be any tubing used in medical applications. In some embodiments, the apparatus are for veterinary medical applications. The deterrent apparatus may be all or part of an IV set (such as a drip line or a pump line) or may be an IV extension.

For each of deterrent apparatus 10, 30, 50 described above and variations thereof, when operably connected to a power source, an electrical circuit is completed when conductor sets 14a, 34a, 54a are electrically connected to conductor sets 14b, 34b, 54b, respectively. When the apparatus is positioned on or in close proximity to a patient, such as an animal patient, the circuit is completed via the sensitive tissues of the patient's mouth when the saliva comes in contact with the charged conductor sets 14a, 14b, 34a, 34b, 54a, 54b. The resulting low voltage electrical shock is harmless yet unpleasant to the patient, thus the patient does not subsequently disturb the apparatus, and treatment or healing may proceed as normal.

This disclosure has provided, at least, a deterrent apparatus comprising an elongated tube body, at least two elongated electrical conductors connected to the tube body in a predetermined configuration, and a power source, the conductors being configured so that they may be contacted on the outside of the tube body by a patient's (e.g., an animal's) tongue or saliva, an electrical circuit being completed and thereby delivering an electrical impulse to the patient. The tube may have a central lumen and be attached to a fluid source at one end, and to a delivery element connected to the body of the patient at its other end, the tube delivering fluid from the fluid source to the delivery element. The fluid source may be an intravenous (IV) fluid container, an intravenous (IV) feeding container, or a gas container (e.g., pressurized oxygen, enriched air, or anesthetic). The delivery element may be a percutaneous needle or a transcutaneous catheter. The tube body is constructed of a non-conductive material, such as an insulative material, and may have a predetermined diameter and a predetermined length. The conductors, on the tube body, may extend the entire length of the tube body or only a portion thereof. The conductors may be conductive foil, conductive tape, conductive wires, or conductive ink on the tube body. The conductors may be copper, stainless steel, silver, or carbon. The conductors may be spiral wrapped on the tube body or may extend straight. The power source may be one battery or multiple batteries in series or in parallel, and may be attached to the tube body, integral with the tube body, or remote. In some embodiments, the power source is connected to the fluid source.

Various variations of deterrents are also disclosed herein. For example, this disclosure also provides an apparatus for discouraging or deterring animals from removing or attempting to remove veterinary medical line systems which are attached to them or otherwise located in their immediate vicinity. The apparatus includes a nonconductive, elongated tube body of a predetermined length and diameter and having a central lumen. Two elongated electrical conductors are connected to the tube body, optionally in a spiral, wrapped configuration, and are also connected to a battery power source. The conductors are configured so that they may be contacted on the outside of the tube body, and upon contact with the animal's tongue or saliva, an electrical circuit is completed through the tongue, conductors and power source, thereby delivering an electrical impulse to the animal.

An additional means of deterrent may include audio emissions that may be sensed (e.g., heard) for example, only by the patient. Audio deterrents are more useful for animal patients than human patients because the frequency range of sound for many domestic animals is greater than for human hearing. The range of hearing for a human is from about 20 to about 20,000 hertz (Hz). For a dog the range is from about 40 to about 60,000 Hz; for a cat from about 45 to about 64,000 Hz. Thus, an apparatus may be constructed to emit an audio emission to provide the form of deterrent for each species of patient. Another additional means of deterrent may be in the form of an odor emission. When the animal's tongue contacts a strip on the tube body, the strip then emits a noxious odor causing the patient to deter from contacting the medical tube, container or injection means.

This disclosure also provides a medical IV line system for discouraging or deterring patients from removing or attempting to remove the system which is attached to them or otherwise located in their immediate vicinity. The system includes a deterrent apparatus, such as deterrent apparatus 10, 30, 50 described above and variations thereof, a power source to which the conductors of the apparatus are operably connected, a fluid source (e.g., medicament source or treatment source) connected to the input end of the deterrent apparatus, and a delivery element connected to the output end of the deterrent apparatus and to the body of a patient at its other end. The tube body of the deterrent apparatus delivers fluid from the fluid source to the delivery element.

The system may be, for example, a veterinary medical IV line system for discouraging or deterring animals from removing or attempting to remove the system which is attached to them or otherwise located in their immediate vicinity. The system comprises:

(a) a non-conductive, elongated tube body of a predetermined length and diameter having a central lumen and an input end and an output end, two electrical conductors connected to the tube body, and a battery power source operably connected to the two conductors, the conductors being configured so that they may be contacted on the outside of the tube body, and upon contact with the animal's tongue or saliva, an electrical circuit is completed through the tongue, conductors and power source, thereby delivering an electrical shock to the animal;

(b) a fluid source connected to the input end of the tube body; and (c) a delivery element connected to the output end of the tube body and to body of an animal at its other end, the tube delivering fluid from the fluid source to the delivery element. The electrical conductors may be connected to the tube boy is in spiral, wrapped configuration.

The invention also provides a method of attaching a deterrent apparatus, such as apparatus 10, 30, 50 to a fluid source, such as a liquid medication container, bottle or bag, or a gas (e.g., pressurized oxygen, enriched air, or anesthetic) canister, and to the patient (e.g., animal) so as to be useful to prevent the patient from removing the apparatus. A doctor, veterinarian or other personnel activates the device by placing the power source (e.g., battery) in the appropriate position thus energizing the conductors. The device is attached to the medication reservoir and patient (e.g., animal). If the patient attempts to remove the protected wound dressing by contacting (e.g., licking and/or biting) the device, an unpleasant low voltage electrical shock is felt by the patient.

Thus, embodiments of the LICK DETERRENT TUBING are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation, and the present invention is limited only by the claims that follow.

What is claimed is:

1. An animal lick deterrent apparatus comprising:
 a non-conductive tubing having a length, an outer surface and an inner surface defining a lumen;
 a first electrical conductor set and a second electrical conductor set present at the outer surface of the non-conductive tubing, the non-conductive tubing insulating the first and second conductor sets from the lumen; and
 a power source having a first output and a second output, the first output electrically connected to the first conductor set and the second output electrically connected to the second conductor set,
 whereby an electrical circuit is completed and electricity flows through the circuit upon electrical connection between the first conductor set and the second conductor set caused by an animal's tongue.

2. The deterrent apparatus of claim 1, wherein the first electrical conductor set and the second electrical conductor set extend the length of the tubing in a spiral manner.

3. The deterrent apparatus of claim 1, wherein the first electrical conductor set and the second electrical conductor set extend the length of the tubing in a non-spiral manner.

4. The deterrent apparatus of claim 3, wherein the first electrical conductor set comprises at least one electrical conductor and the second electrical conductor set comprises at least one electrical conductor.

5. The deterrent apparatus of claim 4, wherein the first electrical conductor set and the second electrical conductor set comprise an equal number of electrical conductors.

6. The deterrent apparatus of claim 1, wherein the first electrical conductor set and the second electrical conductor set are present external to the exterior surface of the tubing, the electrical conductor sets being disposed on the exterior surface of the tubing above the level of the exterior surface.

7. The deterrent apparatus of claim 1, wherein the first electrical conductor set and the second electrical conductor set are present in the tubing between the exterior surface of the tubing and the interior surface, the electrical conductor sets being disposed substantially level with the exterior surface.

8. The deterrent apparatus of claim 1, wherein the power source is a battery and the first output is a cathode and the second output is an anode.

9. An animal lick deterrent apparatus comprising:
a non-conductive tubing having a length, an outer surface and an inner surface defining a lumen;
at least a first electrical conductor and a second electrical conductor present on the outer surface of the non-conductive tubing, the non-conductive tubing insulating the first and second conductor sets from the lumen; and
a power source comprising a battery having a first terminal and a second terminal, the first terminal electrically connected to the first conductor and the second terminal electrically connected to the second conductor, whereby an electrical circuit is completed and electricity flows through the circuit upon electrical connection between the first conductor set and the second conductor set caused by an animal's tongue.

10. The deterrent apparatus of claim 9, wherein the first electrical conductor and the second electrical conductor extend the length of the tubing in a spiral manner.

11. The deterrent apparatus of claim 9, wherein the first electrical conductor and the second electrical conductor extend the length of the tubing in a non-spiral manner.

12. The deterrent apparatus of claim 9 further comprising a third electrical conductor electrically connected to the first terminal.

13. The deterrent apparatus of claim 9 wherein the first electrical conductor and the second electrical conductor comprise electrically conductive wire, foil, tape, thread, conductive ink or conductive polymer disposed on the outer surface of the tubing.

14. The deterrent apparatus of claim 13 wherein the first electrical conductor and the second electrical conductor comprise copper, stainless steel, silver, or carbon.

15. An animal lick deterrent apparatus comprising:
an elongated non-conductive tube body having an outer surface;
at least two elongated electrical conductors connected to the tube body outer surface in a predetermined configuration, the non-conductive tubing insulating the first and second conductor sets from the lumen; and
a power source in electrical connection with the electrical conductors, the conductors configured to be contacted on the outside of the tube body by a patient's tongue or saliva, wherein upon contact, an electrical circuit is completed thereby delivering a mild electric shock to the patient, whereby an electrical circuit is completed and electricity flows through the circuit upon electrical connection between the first conductor set and the second conductor set caused by an animal's tongue.

16. The apparatus of claim 15 wherein the animal is a dog or cat.

* * * * *